Aug. 1, 1961
J. P. BRENDER
2,994,316
CAMP STOVE
Filed Nov. 13, 1956
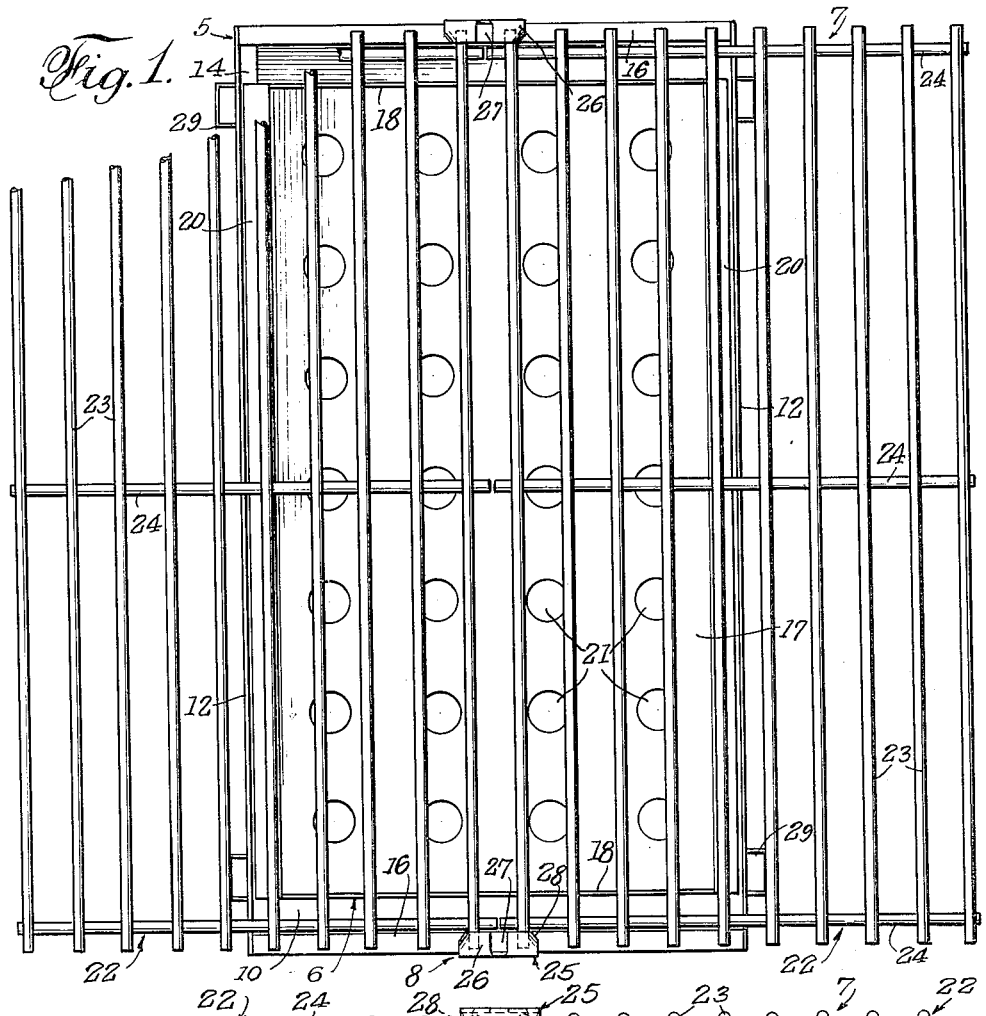
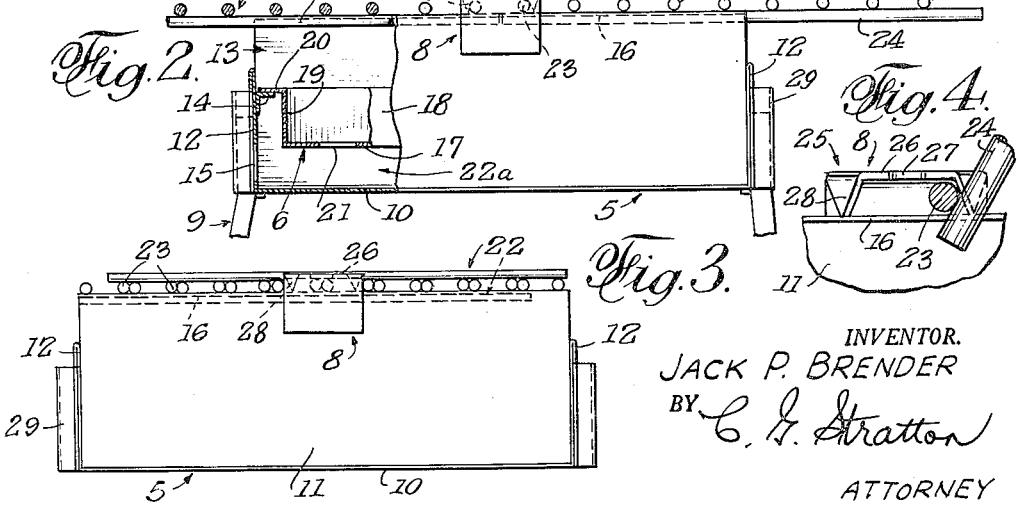
INVENTOR.
JACK P. BRENDER
BY C. G. Stratton
ATTORNEY United States Patent Office 2,994,316
Patented Aug. 1, 1961

2,994,316
CAMP STOVE
Jack P. Brender, 6629 8th Ave., Los Angeles, Calif.
Filed Nov. 13, 1956, Ser. No. 621,915
9 Claims. (Cl. 126—9)

This invention relates to a camp stove or portable barbecue and is particularly characterized by the features of construction that enable compact folding thereof for facile portability.

Another feature and object of the invention is to provide a camp stove or barbecue having a novel cooking grill construction that folds to a compact condition for portability and, in use, provides a large cooking and food warming area.

A further object of the invention is to provide a camp stove in which the grill is adapted to be placed in closure position and within the peripheral or marginal limits of the stove housing or body, said grill thereby retaining not only the internal or grate portions of the stove but, also, housing separable legs for said stove.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes one embodiment of the present invention, which is given by way of illustration or example only.

In the drawing, like reference characters designate similar parts in the several views.

FIG. 1 is a broken plan view of a camp stove or barbecue in cooking or operating condition.

FIG. 2 is a broken end view, partly in section, in the operating condition of FIG. 1.

FIG. 3 is an end view, showing the folded or portable condition of the stove.

FIG. 4 is an enlarged fragmentary view of a detail of construction.

The stove that is illustrated comprises, generally, a housing 5, a grate or the like 6 disposed within said housing, a two-part grill 7, means 8 separably connecting the grill and the housing 5, and separable legs 9 to support the housing from the ground or floor.

The housing is preferably rectangular, as shown, the same having a bottom 10, end walls 11 and side walls 12, the former being preferably higher than walls 12 to form side draft spaces 13. Suitable reinforcements may be provided to render said walls rigid, enabling forming thereof of thin gauge sheet metal. As shown best in FIG. 2, a pair of angle members 14 may be affixed to the inner faces of the side walls 12 and the lower portion of each said wall may be provided with lower draft holes 15. The upper edges of end walls 11 are shown with inturned flanges 16.

The above-described stove body or housing has an open top between flanges 16, at the ends, and walls 12, at the sides.

The grate 6 is also preferably formed of sheet metal, the same having a bottom 17, end walls 18, side walls 19, and outturned flanges 20 on the upper edges of walls 19. Said grate is thus formed as a shallow tray or container adapted to hold a bed of fuel, such as charcoal, wood, briquettes or other solid combustible material and when ignited, to provide a cooking or barbecuing heat that manifests itself in the open top of the housing 5. The bottom 17 is provided with draft holes 21 which also serve to release ash accumulations to the housing bottom 10.

As can be seen in FIG. 2, the grate is supported intermediate the housing bottom and its open top by engagement between angle members 14 and flanges 20 and, as seen in FIG. 1, the grate is longitudinally shorter than the stove housing to provide full air flow between the space 22a in the stove bottom and atmosphere.

In cooking or operative positions, the grate is in the position shown so as to form a fuel-holding container. To create a large storage space within the housing 5, the grate may be inverted so that its bottom 17 is disposed more nearly adjacent the open top of the housing.

The grill 7 comprises similar grill parts or sections 22. Each such section comprises a plurality of spaced and parallel longitudinal rods or wires 23 that are connected adjacent their opposite ends and preferably medial of the ends by cross rods or wires 24. Welds may be used to connect rods 23 and 24. It will be noted from FIG. 3 that the grill sections 22 are slightly narrower than the width of housing 5. Hence, they may be superimposed, as in said figure, to form a closure for the stove, when in portable condition. In operative side-by-side position, the grill sections (FIGS. 1 and 2) combine to provide a food-supporting area that is about twice the width of the housing 5.

The length of rods 23 is such that the ends thereof may rest upon the opposite housing flanges 16 and the end cross rods 24 are aligned and located to reside inward of said flanges to locate the grills against endwise dislodgement. FIG. 2 shows how said flanges and the rods 24 cooperate to prevent such dislodgement.

The means 8 is shown as rod-end retaining members 25 that are carried by the housing end walls 11 centrally between the sides of said housing. Each retaining member 25 is shown as a sheet metal part that has a top wall or bracket 26 spaced above the respective flange 16 to receive the end of a rod 23, as in FIGS. 1 and 4, entry of said ends being afforded through open slots 27 in brackets 26 intermediate the ends thereof. The free corners of said wall are bent toward flanges 16 to form position-limiting stops 28, best seen in FIG. 4, in which it is also shown how a grill part 22 may be tilted and then swung into operative position after the ends of an outer rod 23 have been entered through slots 27 at both ends of the stove.

Since slots 27 are too narrow for more than one rod 23, the grill parts 22 are placed in operative position, one at a time so that their cross rods 24 become aligned as shown. By tilting the outer end of one of the parts or sections 22 upwardly, the rod 23 thereof in members 25 may be slid outward of slots 27 and the grill sections removed. Replacement in operative position or in the overlapped or superposed position of FIG. 3 may be as readily effected.

It will be noted in FIG. 3 that the grill sections are reversed, the lower one having its cross rods 24 below the rods 23 and the upper one having is cross rods above.

The legs 9 may be separably connected to the housing 5 as by telescopic engagement in sockets 29 provided on the side walls 12 of said housing. When in portable condition, the legs are removed from the sockets and placed into the interior of housing 5, preferably below grate 6.

A suitable carrying handle may be provided on one of the housing side walls 12.

While the foregoing has illustrated and described what is now contemplated to be the best mode of carrying out the invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described my invention, what I claim and desire to secure by Letters Patent is:

1. A portable stove comprising a housing having an open top, a grill comprised of two similar separate sections each of a size to close said open top and to extend within the periphery of the housing, each grill section comprising rods and rod-connecting cross wires, and means carried by opposite edges of the top of the housing to separably connect the two grill sections and the housing in superposed position over the open top of the housing substantially covering the same and, selectively, to connect the grill sections in side-by-side operative position with an edge of each in abutment together partly across the housing top and covering the same and partly overhanging the sides thereof, said connecting means comprising a top wall spaced above the edge of the top of the housing with a slot wide enough to receive only one of the grill rods at a time and with inturned end walls preventing movement of said rods outwardly or inwardly of their operative positions.

2. A portable stove according to claim 1, in which the housing and the grill sections are each rectangular, and the section-connecting means is applied to the opposite ends of the housing and connects with the abutting edges of the grill sections.

3. A portable stove according to claim 1, in which the housing and the grill sections are each rectangular, and the section-connecting means is applied to the opposite ends of the housing and connects with the abutting edges of the grill sections, the grill sections being formed of parallel spaced rods and the opposite ends of at least one of said rods on each grill section being separably engaged with the section-connecting means.

4. A portable stove comprising, in combination, an open-topped housing, separable legs connected to the housing to support the same in operative position and to be stored within the housing when separated therefrom, a grate member within the housing, a cover to enclose the legs and grate member and to span the open top of the housing, said cover comprising two similar grill sections having separable connection with the housing while superimposed one on the other and in position to span the housing opening, each grill section comprising rods and rod-connecting cross wires and means carried by opposite edges of the top of the housing to selectively hold said sections in the mentioned spanning position and in a side-by-side position and with an edge of each in abutment together covering said housing openings and extending beyond the periphery of the housing and section-holding means comprising a top wall with a slot wide enough to receive only one of the grill rods at a time with inturned end walls preventing movement outwardly of their operative positions.

5. In the combination according to claim 1, flange portions at opposite ends of the housing, portions of the grill sections being engaged between said flange portions and the mentioned section connecting means.

6. In a camp stove, a pair of similar separate grill sections, each comprising spaced parallel rods connected by more than one transverse rod, a rectangular stove housing having an open top approximately the size and proportion of each grill section, whereby, when separated and superposed, one on the other, the sections span the top and when separated and placed in side-by-side relation, said sections both span the housing top and extend beyond the sides of the housing, and means carried by the housing to separably connect the grill sections and the housing in both positions of the former said connecting means comprising a top wall with a slot wide enough to receive only one of the parallel grill rods at a time, with inturned walls spaced apart to retain the end grill rods of the grill sections and preventing movement of said rods outwardly or inwardly of their operative positions.

7. In a camp stove according to claim 6, the latter means comprising opposed rod-end receiving members, and the grill sections being formed of rods with the ends at least one of the rods on each grill section engageable in said members.

8. In a camp stove having a housing with an open top and end walls having inturned flanges, a grid securing member affixed to each end wall and having an inturned bracket spaced above each respective flange, said brackets being formed with a slot intermediate their ends and said ends being bent downwardly toward the inturned flange therebeneath, two similar grills each formed of spaced parallel longitudinal rods, cross rods connected adjacent the opposite ends of the longitudinal rods, said cross rods extending parallel to the inturned flanges of the end walls, the ends of one parallel longitudinal rod of each grill being disposed in the space between the inturned flanges and the bent bracket ends, the aforesaid slot being wider than the longitudinal rod ends to afford entrance of said rod ends to said space, the two grills in side-by-side relation extending over the open top of the housing and in part overhanging the sides of the housing.

9. In a camp stove according to claim 8, and in which said cross rods of each grill are aligned and positioned in abutment in the space between the inturned flanges of the and walls and the brackets, and held by the bent ends of the brackets against shifting relative to the open top of the housing.

References Cited in the file of this patent

UNITED STATES PATENTS

| 119,116 | Burleigh | Sept. 19, 1871 |
| 1,438,345 | Tait et al. | Dec. 12, 1922 |
| 1,706,886 | Kiler | Mar. 26, 1929 |
| 1,940,454 | Karnes | Dec. 19, 1933 |
| 2,158,805 | Smith | May 16, 1939 |
| 2,357,699 | Stark | Sept. 5, 1944 |
| 2,552,861 | Overman | May 15, 1951 |
| 2,575,082 | Wolff | Nov. 13, 1951 |
| 2,631,579 | Metzger | Mar. 17, 1953 |
| 2,791,959 | Pirz | May 14, 1957 |
| 2,800,071 | Begalka | July 23, 1957 |
| 2,893,373 | Rundle | July 7, 1959 |

FOREIGN PATENTS

| 1,382 | Great Britain | 1911 |
| 535,041 | Great Britain | Mar. 26, 1941 |